(12) United States Patent
Fuehrer et al.

(10) Patent No.: US 9,331,425 B2
(45) Date of Patent: May 3, 2016

(54) CABLE CONNECTOR (75) Inventors: Thomas Fuehrer, Blomberg (DE); Marco Seelig, Leopoldshoehe (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 144 days.

(21) Appl. No.: 14/123,779

(22) PCT Filed: Jun. 4, 2012

(86) PCT No.: PCT/EP2012/060517
§ 371 (c)(1),
(2), (4) Date: Mar. 7, 2014

(87) PCT Pub. No.: WO2012/168194
PCT Pub. Date: Dec. 13, 2012

(65) Prior Publication Data
US 2014/0220808 A1  Aug. 7, 2014

(30) Foreign Application Priority Data

Jun. 8, 2011  (DE) .......................... 10 2011 050 938

(51) Int. Cl.
*H01R 13/627* (2006.01)
*B60L 11/18* (2006.01)
*H01R 13/639* (2006.01)

(52) U.S. Cl.
CPC ........ *H01R 13/6278* (2013.01); *B60L 11/1818* (2013.01); *H01R 13/6272* (2013.01); *H01R 13/6392* (2013.01); *B60L 2270/32* (2013.01);
(Continued)

(58) Field of Classification Search
CPC .................................................. H01R 13/6278

USPC .................................. 439/352, 345, 304, 310
See application file for complete search history.

(56) References Cited

U.S. PATENT DOCUMENTS 8,075,329 B1 * 12/2011 Janarthanam et al. ........ 439/304

FOREIGN PATENT DOCUMENTS

| DE | 19509336 A1 | 9/1995 |
| DE | 19544942 A1 | 7/1996 |
| DE | 102007002025 A1 | 7/2008 |

(Continued)

OTHER PUBLICATIONS

English translation of International Search Report dated Sep. 3, 2012 corresponding to PCT/EP2012/060517, 3 pp.
(Continued)

*Primary Examiner* — Tulsidas C Patel
*Assistant Examiner* — Marcus Harcum
(74) *Attorney, Agent, or Firm* — Ohlandt, Greeley, Ruggiero & Perle, LLP (57) ABSTRACT

The subject matter of the invention is a cable connector (1) for electrically connecting an electric vehicle to a charging apparatus, wherein the cable connector (1) is designed to form an electric connection to a device connector (2) associated with the electric vehicle or the charging apparatus, the cable connector (1) has a latching means (4) which is designed in such a manner that a pair of cable connectors (1) and device connectors (2) connected to each other can be latched to each other by means of the latching means (4), and the cable connector (1) has a counter-contour (10) which is designed in such a manner that a locking means (8) associated with the device connector (2) for locking the latching means (4) against being unlatched can be prevented from being unlocked by the counter-contour (10).

11 Claims, 5 Drawing Sheets

(52) U.S. Cl.
CPC .......... *B60L 2270/34* (2013.01); *Y02T 10/7005* (2013.01); *Y02T 90/14* (2013.01)

(56) References Cited

FOREIGN PATENT DOCUMENTS

| | | | |
|---|---|---|---|
| DE | 102009043845 | A1 | 3/2011 |
| EP | 2293391 | A2 | 3/2011 |

OTHER PUBLICATIONS

English translation of Written Opinion of the International Searching Authority dated Sep. 3, 2012 corresponding to PCT/EP2012/060517, 5 pp.

English translation of International Preliminary Report on Patentability dated Dec. 10, 2013 corresponding to PCT/EP2012/060517, 6 pp.

* cited by examiner

CABLE CONNECTOR

The invention relates to a cable connector for electrically connecting an electric vehicle to a charging apparatus, wherein the cable connector is designed to produce an electric connection to a device connector associated with the electric vehicle or the charging apparatus. The invention further relates to a plug-in connector arrangement comprising the cable connector and the device connector.

Plug-in connectors with electrical locking are known in the field of E-mobility applications and are provided in accordance with standards in order to transfer electrical energy from the charging apparatus to charge a vehicle battery provided in the electric vehicle. To this end, a device connector is often provided on the charging apparatus and on the electric vehicle, such that an electrical connection can be produced between the charging apparatus and the electric vehicle by means of a connection cable which, at both ends, has a cable connector corresponding to the device connector.

A disadvantage with plug-in connectors of this type known from the prior art however is that the locked state can be released manually, for example by unauthorised parties, and this is to be prevented in particular due to safety aspects in the case of plug-in connectors under electrical load. As a result, the existing connection between the plug-in connectors, that is to say therefore between the electric vehicle and the charging apparatus, may be interrupted, which may lead to damage to the electric vehicle, for example if the process of charging the vehicle battery is not yet fully complete. Damage of this type may then result in the fact that the vehicle battery ages prematurely or is even completely destroyed and has to be replaced, which is costly.

The object of the invention is therefore to specify plug-in connectors for connecting an electric vehicle to a charging apparatus, said plug-in connectors not being releasable from one another undesirably as a result of unauthorised access.

The object is achieved in accordance with the invention by the features of the independent claims. Advantageous embodiments of the invention are specified in the dependent claims.

The object of the invention is therefore solved by a cable connector for electrically connecting an electric vehicle to a charging apparatus, wherein the cable connector is designed to produce an electric connection to a device connector associated with the electric vehicle or the charging apparatus, the cable connector has a latching means which is designed in such a way that a pair of interconnected cable connectors and device connectors can be latched to one another by the latching means, and the cable connector has a mating contour which is designed in such a way that a locking means associated with the device connector for locking the latching means against being unlatched can be prevented from being unlocked by the mating contour.

In accordance with the invention, the cable connector thus has a mating contour which prevents unauthorised unlocking of the locking means, such that an undesirable release of the cable connector from the device connector, for example by unauthorised third parties, can be prevented in a particularly advantageous manner. Only when the locking means releases the locked state of the latching means, that is to say for example once the vehicle battery associated with the electric vehicle has been fully charged, can the cable connector be removed from the device connector by releasing the latched state.

The invention therefore makes it possible to prevent unauthorised manipulation of the locked state, be it manually or with an appropriate tool, such that the vehicle battery can be charged without interruption by energy provided by the charging apparatus. Since the charging of the vehicle battery cannot be unintentionally interrupted on account of the embodiment according to the invention of the cable connector, the vehicle battery can be charged in a controlled manner, which lengthens the service life of the vehicle battery and therefore leads to lower maintenance costs of the electric vehicle.

The cable connector and/or the device connector can in principle be designed as any plug-in connectors known from the prior art for producing an electrical connection between an electric vehicle and a charging apparatus and, to this end, has/have electrical contacts corresponding to one another. Likewise, the cable connector according to the invention can be used in conjunction with any electric vehicle known from the prior art and also any charging apparatus. Whereas the latching means is preferably designed to produce a form-locked and/or force-locked connection between the cable connector and the device connector, the latching means is preferably locked in a form-locked manner by the locking means against being unlatched. Here, in the scope of the invention, the term "unlatched" means the state of the latching means in which the cable connector and the device connector are not latched to one another, and the term "unlocked" means the state of the locking means in which the latching means is not prevented by the locking means against being unlatched.

In principle, the mating contour according to the invention can be designed arbitrarily to achieve the effect according to the invention of preventing unauthorised and/or unintentional unlocking of the latching means, and therefore as a cover or as an overhang, for example. The mating contour is particularly preferably designed however in such a way that the locking means for locking the latching means can be introduced at least in part into the mating contour, and/or, when the locking means locks the latching means, the mating contour surrounds the locking means and bears thereagainst at least in part. It is therefore preferable if the mating contour can be designed for example "cavernously" to receive the locking means, wherein the locking means in the locked state preferably bears directly with contact against the mating contour. The mating contour may also have a circular, partly circular, or U-shaped contour for receiving the locking means. Since, in accordance with this embodiment, the locking means can be introduced at least in part into the mating contour and/or the mating contour surrounds the locking means and bears thereagainst at least in part, it is possible to ensure in a particularly simple manner that the locking means is protected against external manipulation, that is to say unauthorised separation of the cable connector from the device connector.

In accordance with another embodiment of the invention, it is preferable if the latching means is arranged and designed on the cable connector pivotably for latching and unlatching and is acted on by spring force, in such a way that the latching means is biased into its latched position due to the spring force. Here, it is furthermore preferable if an actuation apparatus is provided on the pivotably arranged and designed latching means and is formed for example as an actuation surface, such that, by pressing of the actuation apparatus, for example by an operator, the latching means can be unlatched from its latched position, such that the cable connector can then be released from the device connector. An unlatching of this type is then only possible however, as already mentioned, when the locking means is not locking the latching means.

The latching means supported by springs in such a way is advantageously formed as a latching hook which is arranged for simple operation on an outer face of the housing of the cable connector. Since the latching means is acted on by spring force, it can additionally be ensured that, as the cable connector is introduced into the device connector, the cable connector automatically latches with the device connector, preferably when the cable connector is introduced fully as far as a stop in the device connector.

The object of the invention is furthermore achieved by a plug-in connector arrangement comprising the cable connector and a device connector, wherein the device connector has a latching recess for latching of the latching means, the device connector comprises the locking means, and the locking means is movable axially in the plug-in direction of the connector to lock and unlock the latching means. Here, the latching recess is preferably formed as a latching lug, and the latching means is preferably formed as a latching hook. It is further preferable if the locking means is arranged on the device connector at a distance from the plug-in face of the device connector and is arranged movably, in the axial plug-in direction, out from the device connector and at least in part into the cable connector connected to the device connector in order to lock the latching means, and back into the device connector in order to unlock the latching means. In addition, it is preferable if the latching recess and the latching means are arranged at a distance from the respective plug-in face of the device connector and cable connector respectively, wherein the latching means and the latching recess are most preferably arranged between the locking means and the plug-in face of the device connector and the cable connector respectively. Here, the plug-in face preferably has a plurality of electrical contacts, wherein the cable connector is formed either as a socket or as a plug, and the device connector is formed either as a plug or as a socket respectively. It is likewise possible for the latching means and the mating contour to be arranged not on the cable connector, but on the device connector, and for the locking means to be arranged not on the device connector, but on the cable connector.

In accordance with a further embodiment of the invention, it is preferable if the cable connector has a cable connector housing and the device connector has a device connector housing, the mating contour is arranged on the cable connector housing, and the cable connector housing and the device connector housing are designed in such a way and the locking means is arranged in such a way that, when the cable connector is connected to the device connector, the locking means is arranged in its locking position only in the cable connector housing and the device connector housing. This means that, in accordance with this embodiment of the invention, the locking means in its locking position and preferably also in its unlocking position is arranged only within the device connector and the cable connector, or in its unlocking position is arranged only within the device connector, that is to say is not accessible from outside the connector housing, and therefore cannot be unlawfully manipulated in terms of its position by third parties. Here, it is preferable if, when the cable connector is connected to the device connector, the cable connector via the mating contour bears directly with contact against the device connector.

In accordance with an alternative embodiment of the invention, the cable connector has a cable connector housing, and the device connector has a device connector housing, the mating contour is arranged on the cable connector housing, and the cable connector is connectable to the device connector in such a way that, when the cable connector is connected to the device connector a gap of ≤2 mm, preferably ≤1 mm, and most preferably ≤0.5 mm, remains between the mating contour and the device connector. In accordance with this embodiment, it is thus preferable if, when the cable connector is connected to the device connector, a "small" gap is provided between the connectors, wherein the gap is so small however that the locking means even in this embodiment cannot be manipulated from outside the connector housing, that is to say for example cannot be displaced from the locking position into the unlocking position. By providing a gap of this type, it is possible to compensate for manufacturing tolerances of the connectors, for example, and the connectors can nevertheless be prevented from being released from one another by unauthorised parties.

In principle, the locking means can be designed arbitrarily, wherein, in accordance with a particularly preferred embodiment of the invention however, the locking means is designed as a locking pin or as a locking bolt. Furthermore, it is preferable if the locking pin or the locking bolt, at least at its end facing away from the device connector, rests on the latching hook in the locking position and preferably locks the latching hook with contact in its latching position. Designed in this way, the locking means prevents the latching means from pivoting out of its latching position, for example in the event of accidental or deliberate mal-operation, and prevents an accompanying release of the connection between the connectors.

Since the entire axial locking force of the connectors is preferably ensured via the appropriately dimensioned latching hook as a latching means, the locking pin or the locking bolt experiences only a transverse load or bending load by intercepting manually applied operating forces at the latching hook. The provision of the locking means as a locking pin or as a locking bolt is furthermore also advantageous in the case of an aforementioned embodiment of a gap between the connectors, since a locking pin or locking bolt with smooth outer contour cannot be manipulated from outside the connector housing on account of the small gap diameter. In accordance with a further embodiment, it is preferable if the locking means and the mating contour each have a contour corresponding to one another, and most preferably bear against one another with contact at least in part in the locked state.

In principle, the locking means can be actuated in any manner known from the prior art, for example by a motor provided in the device connector. In accordance with a particularly preferred embodiment of the invention however, the device connector has an actuator, which can be controlled by means of an electrical pulse, for actuating the locking means, and the device connector has a power source for generating the electrical pulse. Here, the power source can be designed on the one hand as a battery or capacitor provided in the device connector and/or can also be supplied with energy by the vehicle battery. In the first-mentioned case, that is to say when an independent energy source in the form of a battery or a capacitor is provided in the device connector, the locked state can be released even in the event of a power failure, and therefore the electric vehicle can be removed from the charging apparatus in spite of a power failure.

Further embodiments of the plug-in connector arrangement will become clear to a person skilled in the art by analogy with the cable connector according to the invention.

The invention will be explained in greater detail hereinafter on the basis of preferred embodiments with reference to the accompanying drawings, in which.

Figure 1:
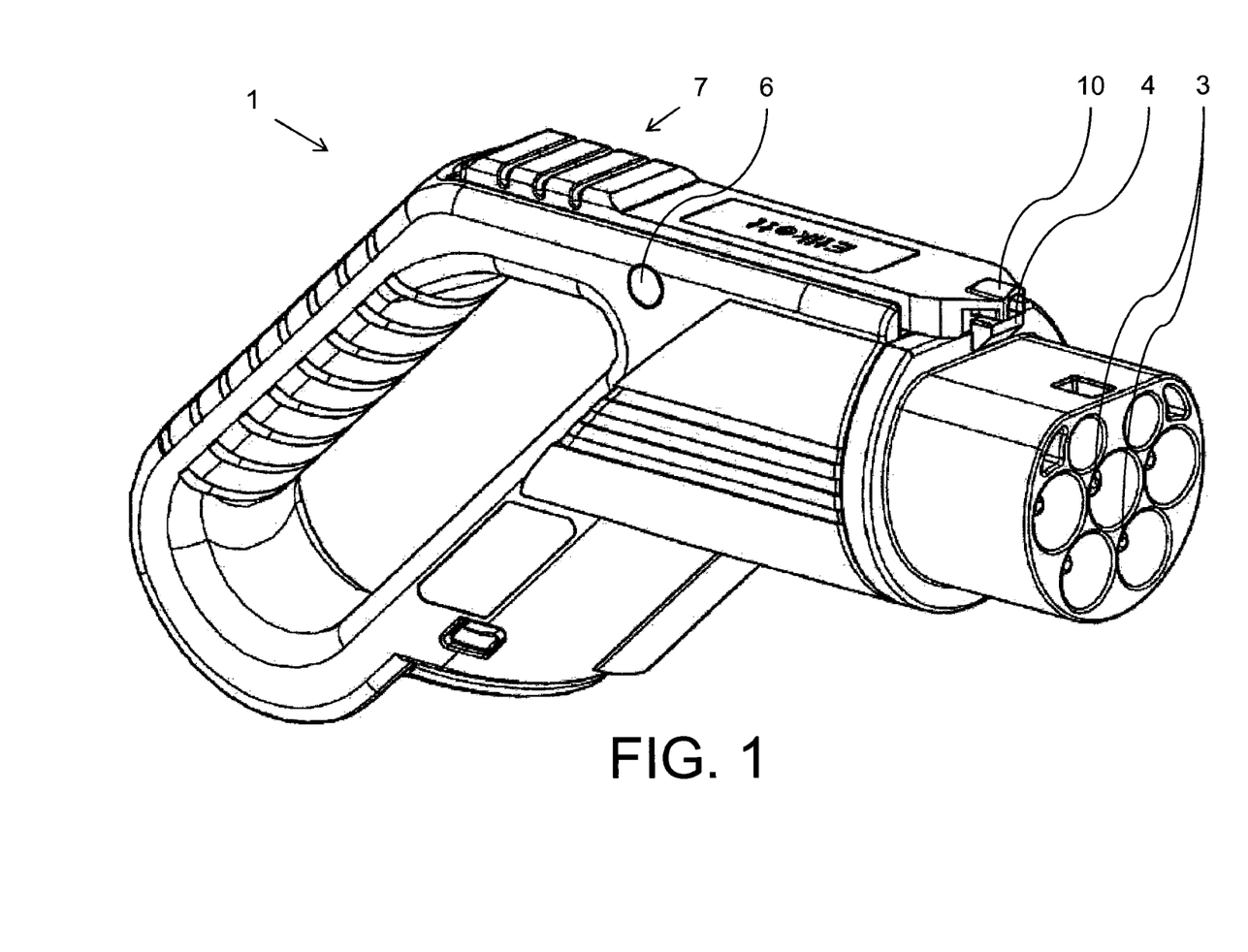
FIG. 1 shows a perspective view of a cable connector according to a preferred embodiment of the invention.

In FIG. 1, a cable connector 1 according to a preferred embodiment of the invention is shown in a perspective view.

Figure 2:
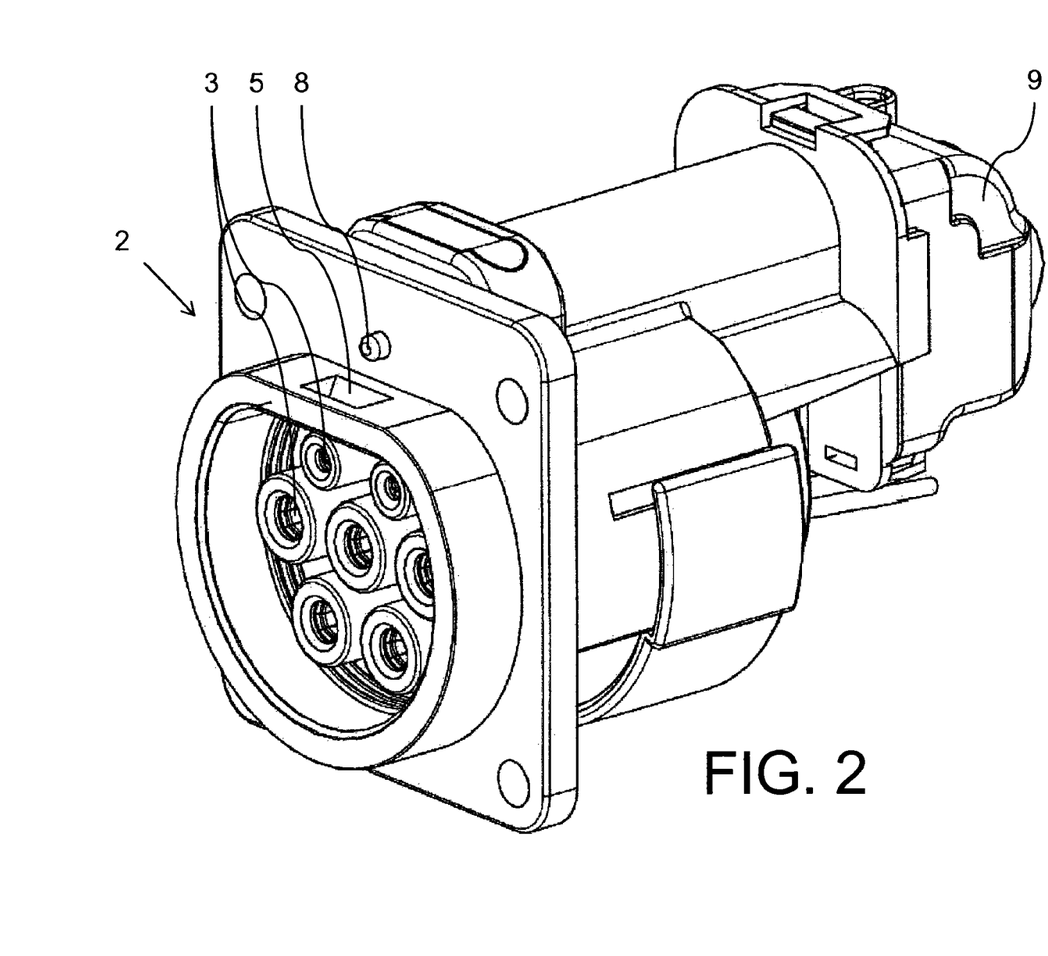
FIG. 2 shows a perspective view of a device connector of a plug-in connector arrangement according to the invention.
Figure 3:
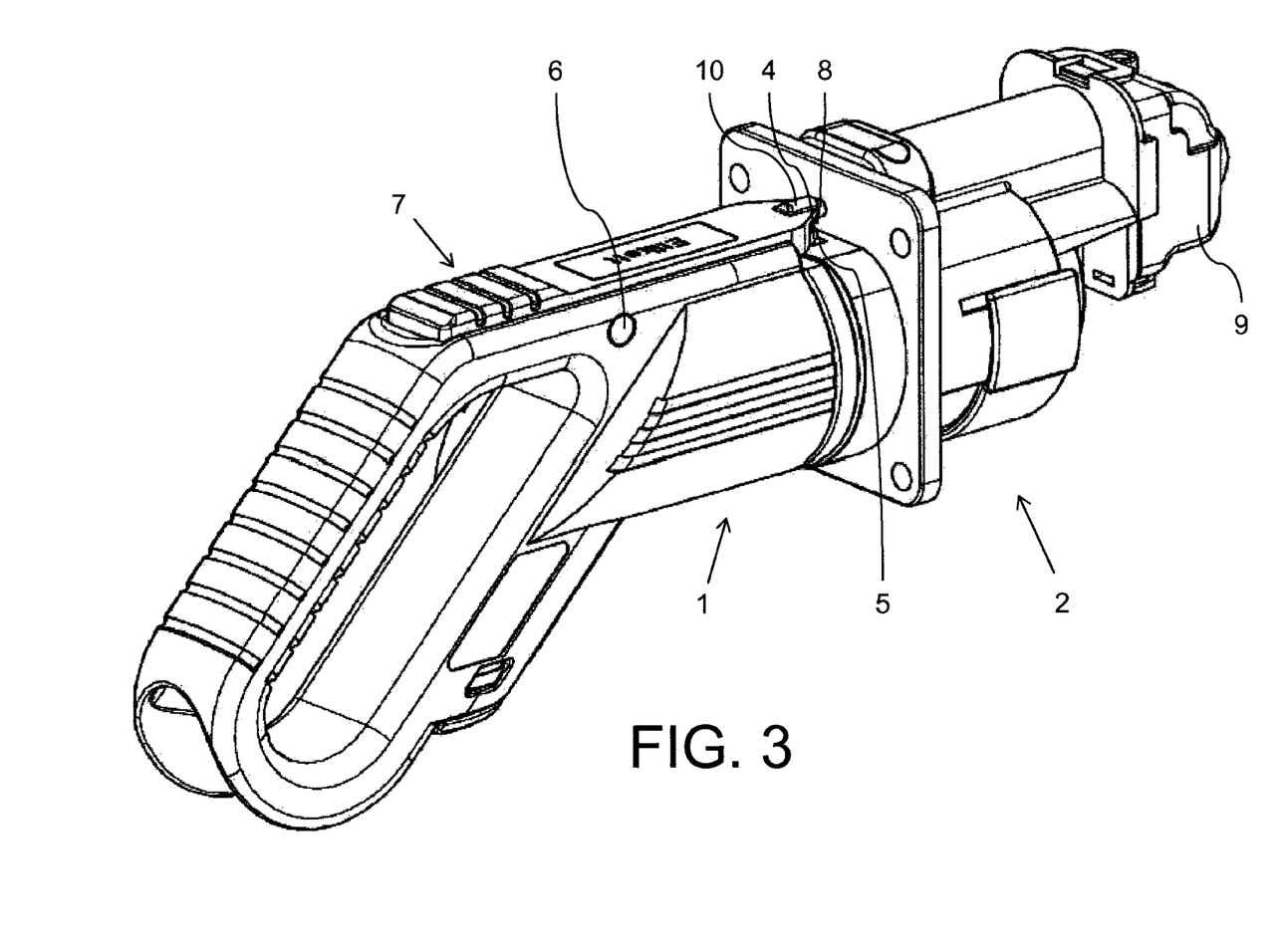
FIG. 3 shows a perspective view of a plug-in connector arrangement according to a preferred embodiment of the invention.
Figure 4:
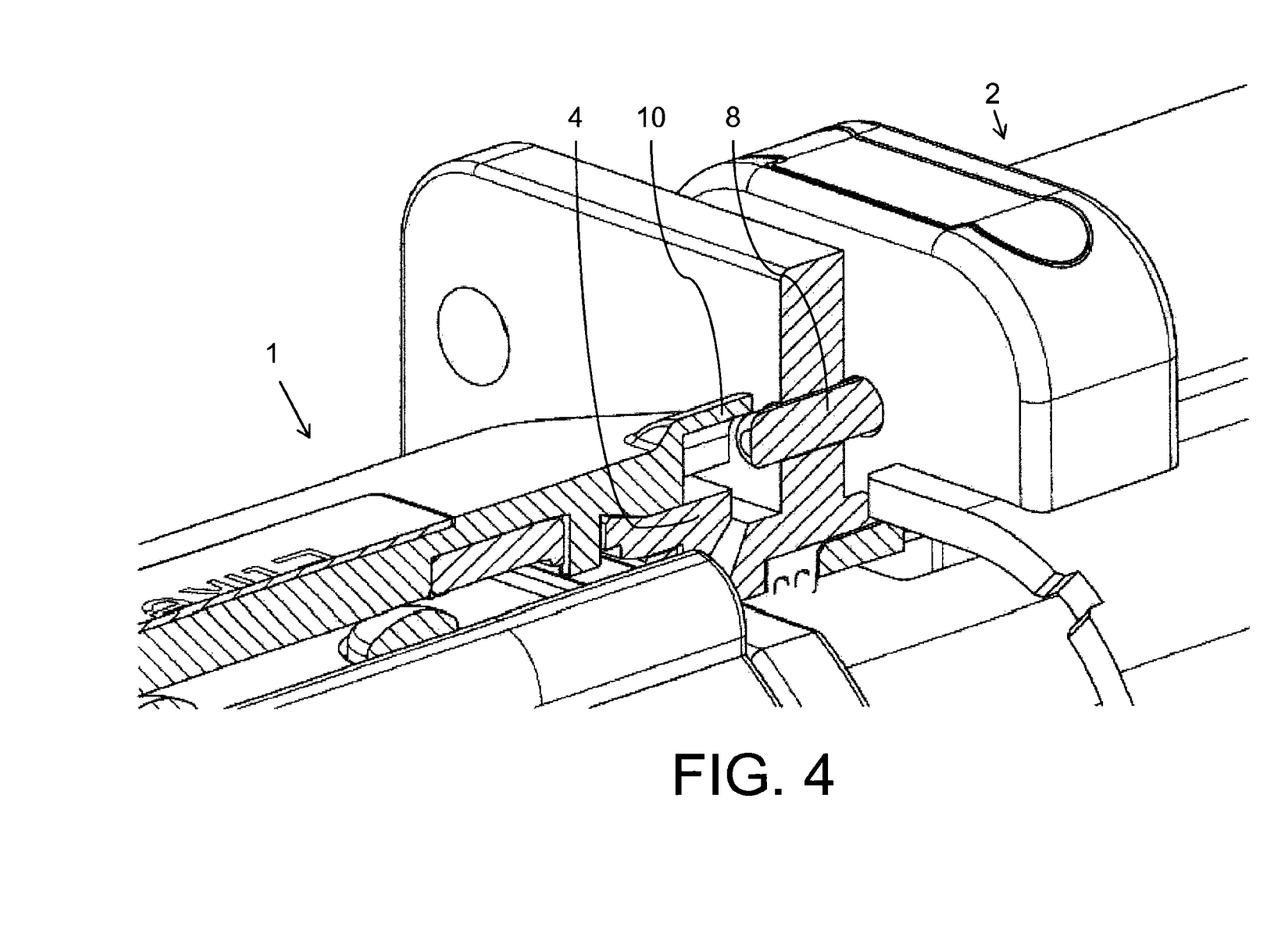
FIG. 4 shows a perspective, partly cut-away view of a detail of the plug-in connector arrangement in the unlocked state.
Figure 5:
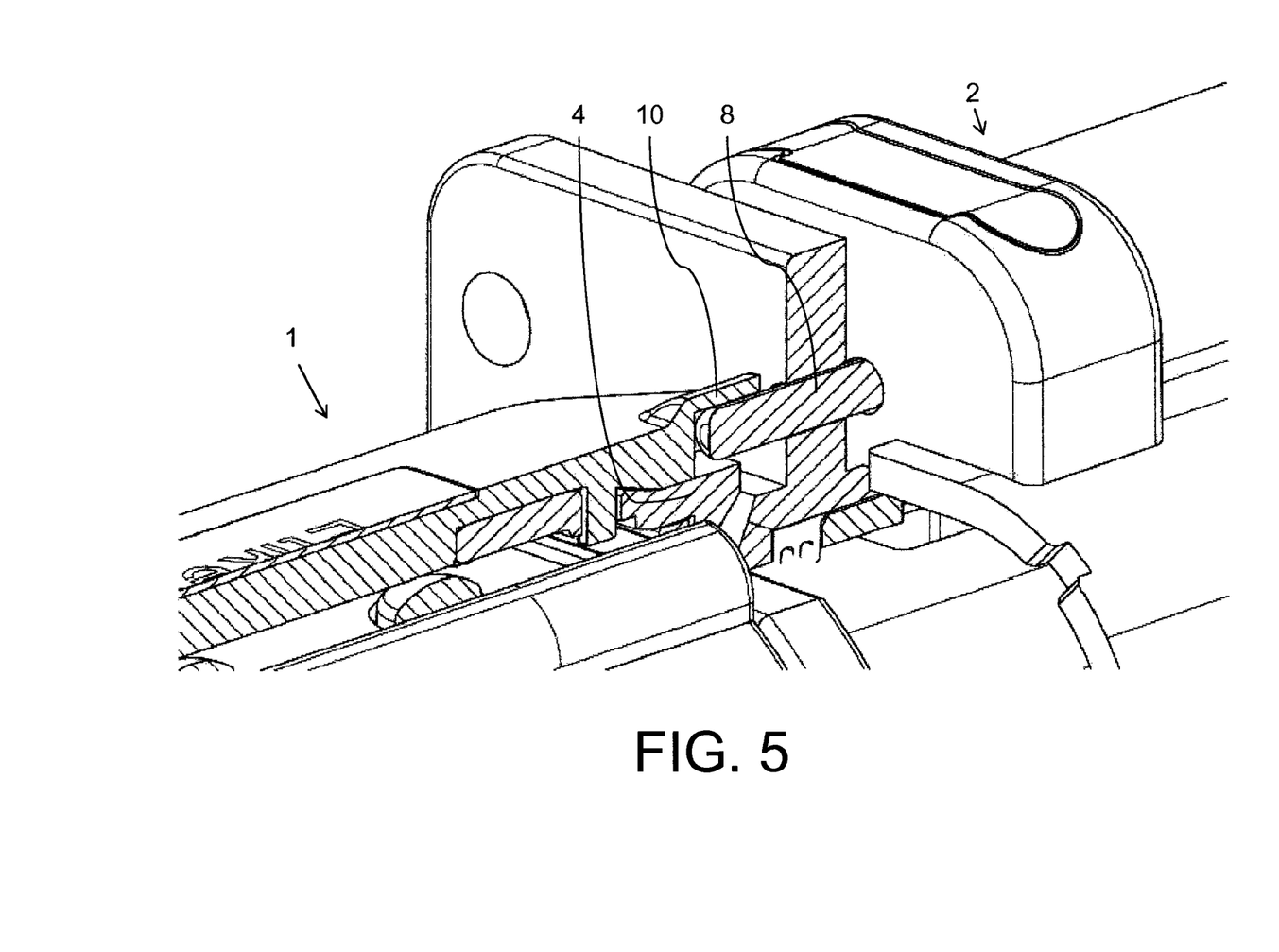
FIG. 5 shows a perspective, partly cut-away view of the detail of the plug-in connector arrangement according to the invention in the locked state.

The cable connector 1 is intended to produce an electrical connection between an electric vehicle and a charging apparatus, wherein the cable connector 1 is connectable to a corresponding device connector 2 (illustrated in FIG. 2) to form a plug-in connector arrangement, as can be seen from FIG. 3 and also in part from FIG. 4 and FIG. 5. A connection cable can be provided at each of its ends with a cable connector 1, wherein the connection cable can then be connected via its cable connectors 1 to a device connector 2 associated with the electric vehicle and charging apparatus respectively to produce an electrical connection between the electric vehicle and the charging apparatus, for example to charge a vehicle battery associated with the electric vehicle.

To produce the electrical connection between the connectors 1, 2, each of the connectors 1, 2 has a plurality of electrical contacts 3, which are formed in the present case as corresponding plug or socket pins. So that the cable connector 1 and the device connector 2 cannot only produce a force-locked connection in the plugged state, but also a form-locked connection, a latching means 4 formed as a latching hook is provided on the cable connector 1 and, when the cable connector 1 is connected to the device connector 2, latches into a latching recess 5 provided on the device connector 2. The latching means 4 is mounted pivotably via a bolt 6 on the cable connector 1, wherein an actuation surface is provided, which, by "pressing", causes the latching means 4 to be unlatched from the latching recess 5, such that the connectors 1, 2 can be released from one another. In doing so, the latching means 4 is acted on by spring force in such a way that the latching means 4 is in principle biased into its latched state.

In order to now ensure that, in the connected and latched state of the connectors 1, 2, illustrated in FIG. 3, the latched state produced by the latching means 4 and the latching recess 5 cannot be released, a locking means 8 formed as a locking pin is provided and is movable axially in relation to the plug-in direction of the connectors 1, 2 by means of an actuator 9 provided on the device connector 2. Here, the latching means 4 can be unlatched from the latching recess 5 in an unlocking position, illustrated in FIG. 4, whereas the latching means 4 cannot be unlatched from the latching recess 5 in a locking position, illustrated in FIG. 5, in which the locking means 8 bears with contact at least in part against the latching means 4. Both the latching means 4 and the latching recess 5 and also the locking means 8 are radially distanced from the electrical contacts 3, wherein, in the present case, the locking means 8 is distanced further from the electrical contacts 3 than the latching means 4.

In accordance with the invention, the cable connector 1 now has a mating contour 10, by means of which the locking means 8 can be prevented from being unlocked since the unlocking means 8 is covered by the mating contour 10 designed as an overhang and therefore does not allow any external access to the locking means 8, for example within the scope of unlawful manipulation by manual or tool-assisted intervention.

Here, a gap of a few millimeters, for example 1 or 2 mm, may be provided between the device connector 2 and the mating contour 10, said gap, due to this short gap width, preventing the locking means 8 from being displaced axially. The mating contour 10 in the connected state of the connectors 1, 2 may also bear with contact against the device connector 2, such that the mating contour 10 covers the locking means 8 fully in the region of its tip and covers it against external access, such that the locking means 8 is thus not accessible from outside the device connector housing or the cable connector housing.

In the present case, the mating contour 10 is designed in such a way that the locking means 8 formed as a locking pin can be introduced at least in part, specifically by its tip, into an opening formed by the mating contour 10 and the latching means 4, and, in the locked state, as illustrated in FIG. 5, bears with contact against the mating contour 10 and against the latching means 4. The locking means 8 in a particularly simple manner therefore cannot be brought by an unauthorised party from its locking position, in which the latching means 4 is prevented from being unlatched from the latching recess 5, that is to say the connectors 1, 2 therefore cannot be released from one another, into its unlocking position.

In a further embodiment, the actuator 9 or the device connector 2 may have a power source (not illustrated) for generating an electrical pulse, by means of which the actuator 9 can be controlled so as to lock or unlock the latching means 4 by means of the locking means 8.

LIST OF REFERENCE SIGNS cable connector 1
device connector 2
contacts 3
latching means 4
latching recess 5
bolt 6
actuation surface 7
locking means 8
actuator 9
mating contour 10

The invention claimed is:

1. A cable connector for electrically connecting an electric vehicle to a charging apparatus, wherein the cable connector provides an electrical connection to a device connector associated with the electric vehicle or the charging apparatus, the cable connector comprising:
    latching means that latches a pair of interconnected cable connectors and device connectors to one another; and
    a mating contour that covers a locking means associated with the device connector, wherein the locking means locks the latching means, and wherein the mating contour prevents the locking means from being unlocked.

2. The cable connector according to claim 1, wherein the mating contour is configured so that the locking means be is introduced at least in part into the mating contour, and/or, when the locking means locks the latching means, the mating contour surrounds the locking means and bears thereagainst at least in part.

3. The cable connector according to claim 1, wherein the latching means can pivot on the cable connector for latching and unlatching and is biased into its latching position by a spring force.

4. A plug-in connector arrangement comprising a cable connector according to claim 1 and the device connector, wherein the device connector includes a latching recess for latching of the latching means, wherein the device connector includes the locking means, and wherein the locking means is movable axially in the plug-in direction of the cable connector and the device connectors.

5. The plug-in connector arrangement according to claim 4, wherein the cable connector further comprises a cable connector housing, wherein the device connector further comprises a device connector housing, wherein the mating contour is arranged on the cable connector housing, and wherein the cable connector housing, the device connector housing and the locking means are configured so that, when the cable connector is connected to the device connector, the locking means is arranged only within the cable connector housing and the device connector housing.

6. The plug-in connector arrangement according to claim 5, wherein when the cable connector is connected to the device connector, a gap of ≤2 mm is formed between the mating contour and the device connector.

7. The plug-in connector arrangement according to claim 4, wherein the locking means is as a locking pin.

8. The plug-in connector arrangement according to claim 4, wherein the locking means and the mating contour have corresponding contours.

9. The plug-in connector arrangement according to claim 4, wherein the device connector further comprises an actuator for actuating the locking means that, is controllable by an electrical pulse, and wherein the device connector further comprises a power source for generating the electrical pulse.

10. The plug-in connector arrangement according to claim 6, wherein the gap between the mating contour and the device connector is ≤1 mm.

11. The plug-in connector arrangement according to claim 6, wherein the gap between the mating contour and the device connector is ≤0.5 mm.

* * * * *